Dec. 15, 1942.  J. D. EISLER  2,304,901
TIMING DEVICE
Filed Feb. 19, 1940
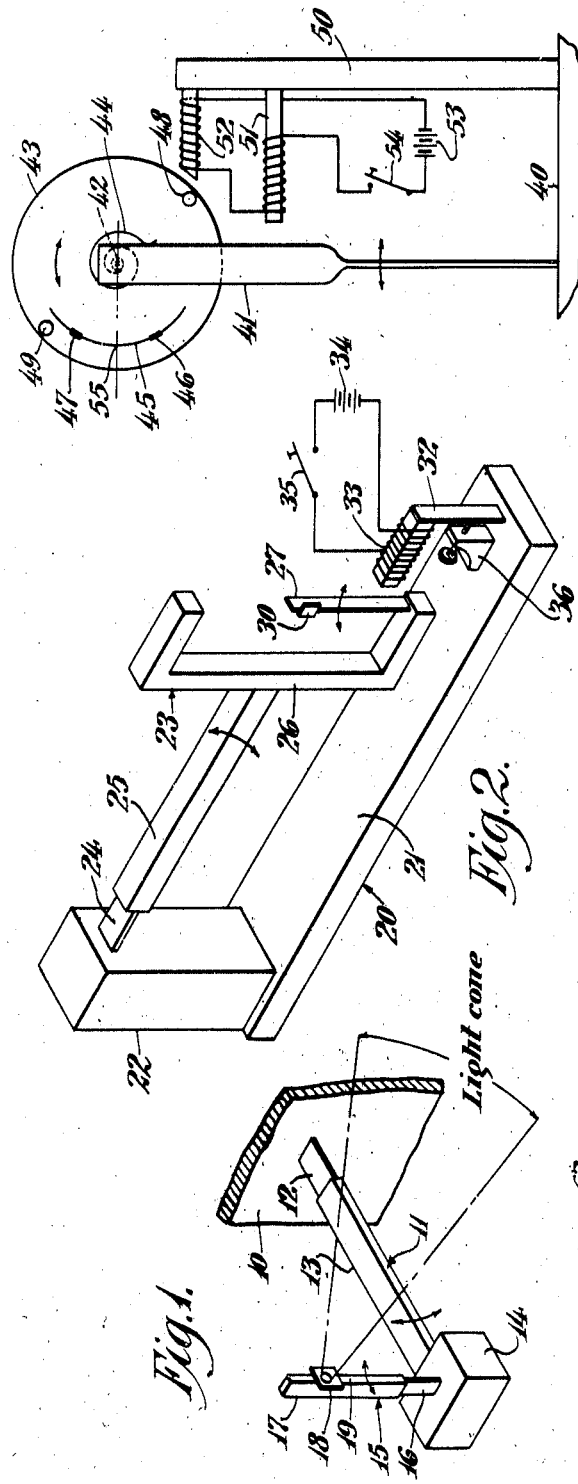
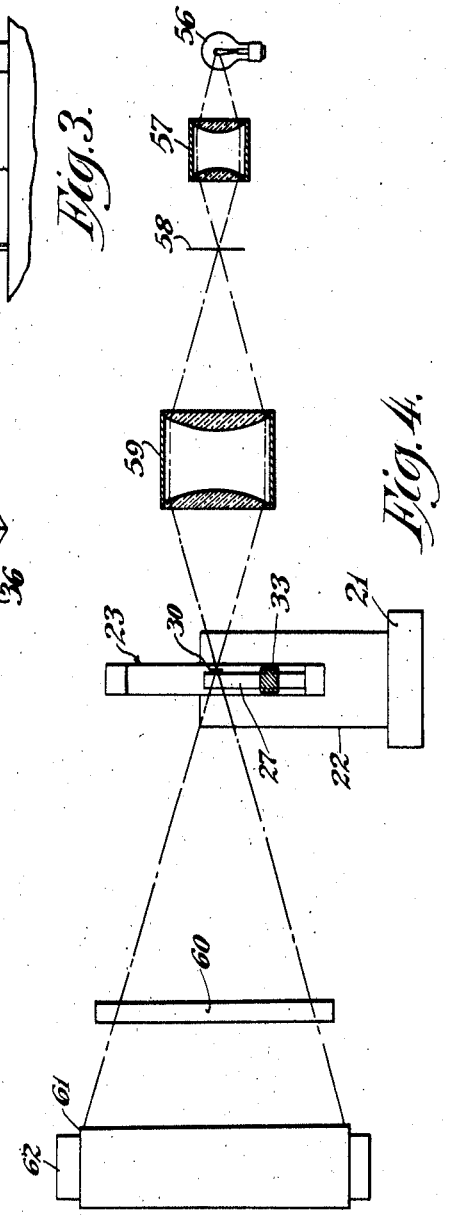
Inventor:
Joseph D. Eisler
By Geo. L. Parkhurst
Attorney Patented Dec. 15, 1942

2,304,901

UNITED STATES PATENT OFFICE 2,304,901

TIMING DEVICE

Joseph D. Eisler, Tulsa, Okla., assignor to Stanolind Oil and Gas Company, Tulsa, Okla., a corporation of Delaware Application February 19, 1940, Serial No. 319,636

8 Claims. (Cl. 234—60)

This invention relates to timing devices and particularly to timing devices for use in the art of seismic surveying.

In seismic surveying operations waves produced from a given source, which is usually the firing of an explosive charge, are received at a number of spaced seismometers. These seismometers generate electrical currents which are amplified and fed to separate oscillograph strings in an oscillograph camera. This camera contains a moving strip of photographic material and each seismometer or set of seismometers produces through its associated amplifier and oscillograph element a separate trace on this moving strip of photographic material.

To translate the records thus obtained into usable data, it is necessary to determine the relative time of various events shown on such records with great accuracy, of the order of 0.001 second, and to this end it is customary to place timing lines on these records by any of a variety of means. One method by which this has been done in the past is to use a light interrupting disc driven by a motor, the speed of which is very accurately electrically controlled by a tuning fork. Such interrupting discs normally have light interrupting elements of different sizes so that, for instance, a light beam is interrupted very briefly every one hundredth of a second and for a slightly longer time each one tenth of a second. The light beam is normally focused by a cylindrical lens on a photographic film, so that the interruptions of the light beam produce a record in which there are very fine timing lines at one hundredth second intervals and somewhat broader ones at one tenth second intervals. By this means the determination of the time of any given event shown on the record is both simple and accurate.

Such systems, however, have serious disadvantages in that they involve complicated equipment which is likely to get out of order in spite of careful checking and is sometimes of questionable accuracy. A more simple system has been used in the past consisting of a vibrating reed or pendulum which serves directly to interrupt or reflect a light beam and thus forming timing marks. This has also been found disadvantageous, however, since the timing marks are all of uniform size and as they are normally at one hundredth second intervals, the calculation of a time interval extending in some instances over several seconds involves very laborious counting and introduces an obvious possibility of error. In spite of this, the reed system has been frequently used because of its inherent freedom from mechanical difficulties and changes in frequency.

It is, therefore, an object of this invention to provide a novel timing device which obviates these difficulties. More particularly, it is an object of this invention to provide a new timing device which is at the same time simple and highly precise, and capable of indicating both uniform intervals of time and multiples of such unit intervals. A still more specific object is to provide such a timing device which is particularly adapted to record timing marks on photographic materials. A further object is to provide a timing device which is simple and accurate and capable of producing timing marks on photographic paper in which integral multiples of the minimum time intervals are also indicated, by varying the quantity of light reaching such photographic paper at uniform intervals of time and by making such variations greater at multiples of such intervals. Another object is to provide a timing device capable of producing such marks once it is set into operation without requiring any further supply of energy. Other objects will appear hereinafter.

It has now been found that these objects can be accomplished by a device in which one oscillating member is mounted on another oscillating member having a different rate of vibration, with the latter member oscillating either faster or slower than the one mounted upon it as desired. It will be understood that the expression "oscillating member" is used herein in its broadest sense and that the oscillating elements employed in the device described herein may be of any desired type or of a variety of types and may be mounted one upon the other in a variety of ways.

The oscillating elements are provided with any desired type of means for varying the quantity of electromagnetic waves, for example, light, is received at a given point to at least two different extents and the oscillating members and wave varying means are so arranged that the wave varying means operate at intervals bearing a constant relation to the rates of vibration of the members. At least one means being so related to each member and since the members each vibrate at a fixed rate, the rates of operation of the wave varying means also bear a constant relation to each other. Any of an extensive variety of arrangements as described, can be used. Several such are described more fully hereinafter and particularly in the light of the specific description the other variations will be readily apparent to those skilled in the art.

In a preferred arrangement the members vibrate at right angles to each other where both are of the reed type and generally in coincident planes or in planes perpendicular to the same line regardless of type. Both the absolute and relative rates of vibration of the members may be varied as desired but preferably they are chosen so that the ratio of their rates of vibration is a whole number. It is also preferred that the absolute rates of vibration shall be equal to $5n$ where $n$ is a whole number which is different for each member. The number of times that the wave varying means operates depends, however, not only on the rates of vibration of the members but also on the placement of the varying means as will become more obvious hereinafter. The varying means are placed so that they act either once or twice during the cycle of the member to the movement of which their rate of operation is related, i. e. they are placed so that they operate either at the limits of vibration of the members, or preferably at the time the members pass through their rest positions, or in a given device one means may operate at the rest position of its related member while another operates at a limit of vibration of its related member. Thus the short variation may occur, for example, once every cycle or once every half cycle of the faster member and the long variation may occur, for example, once every cycle or once every half cycle of the slower member. A preferred arrangement involves having the long variations occur at every ten of the shorter variations as, for example, having short variations at every hundredth of a second and longer ones every fifth or tenth of a second.

In order that the invention may be better understood but without any intent to limit the invention thereby, a drawing illustrating various applications of the invention accompanies this specification and forms a part thereof. In this drawing:

Figures 1 and 2 are respectively, isometric drawings of two different embodiments of the invention for recording timing lines on photographic paper in connection with the recording thereon of impulses received from a series of spaced seismometers (not shown) used in a seismic surveying operation as outlined above, for example. Figure 3 is an elevation of a third embodiment. Figure 4 is a side elevation of an arrangement embodying the device shown in Figure 2.

Referring now more particularly to Figure 1 it will be seen that the specific form of the device there shown comprises a base 10 and mounted thereon an oscillating member 11 of the vibrating reed type. Member 11 includes a spring 12 which is directly attached to the base 10 in a horizontal position so that when energized it vibrates in a vertical plane. Extending out from spring 12 is an arm 13 which forms the other part of member 11. A secondary base 14 is secured to the outer end of member 11. On this base 14 a second member 15 of the vibrating reed type is mounted so that it vibrates in the same plane as member 11 but so that when the entire system is at rest the center line of the second member 15 is perpendicular to the horizontal center line of member 11. Member 15 is similar to member 11 in that it consists of a spring 16 attached to the base 14 and an arm 17 extending up from the spring 16. A rectangular mask or reflector 18 is secured to the edge 19 of arm 17 a substantial distance in from either end thereof. Mask 18 it will be seen lies in a plane parallel to the plane of vibration of the oscillating members 11 and 15.

The device shown in Figure 1 is intended to be used to make timing lines on a moving sheet of photographic paper. It accomplishes this in a manner to be more fully described hereinafter, when it is placed in an optical train in a recording oscillograph or camera, between a light source and photographic paper, preferably at such a position that the light passing to the sensitive paper is focussed roughly in the center of mask 18 so that at rest all light is blocked off.

Turning now to Figure 2, the form of the device there illustrated is quite similar to that shown in Figure 1 but differs in that it embodies a preferred method of mounting the members and also shows a convenient means for energizing them. The device includes a base 20 having a horizontal portion 21 and an upwardly extending portion 22. A member 23 is mounted thereon. It consists of a spring 24 which is directly attached to the base 20 in a horizontal position so that when energized the spring vibrates in a roughly vertical plane. Extending out from spring 24 is an arm 25 which is the heaviest part of member 23. To the end of arm 25 a half-rectangular part 26 is secured in a vertical position to serve as a base for a second oscillating member 27 which is mounted thereon so that it vibrates in the same plane as member 23 but so that when the system is at rest the center line of the member 27 is perpendicular to the roughly horizontal center line at rest of member 23. Osciliating member 27 is similar to member 23 in that it consists of a spring 27 attached to the base 26, and a weight 30. This weight 30 is in the form of a rectangular mask secured to the edge 31 of spring 27 a substantial distance in from either end thereof. Mass 30 thus lies in a plane parallel to the plane of vibration of the members 23 and 27, and is situated on the center line of member 23.

Also, attached to a part of horizontal portion 21 of base 20 extending out beyond half-rectangular base 26 is another spring 32 to the upper end of which is secured an electromagnet 33. Electromagnet 33 is so mounted that both members 23 and 27 are in its field of force and so that the line of action of force due to the magnet does not coincide with the center line of member 23. A source of electric power 34 is connected to magnet 33 through a switch 35. When switch 35 is closed momentarily the electromagnet 33 is energized and it and member 27 are simultaneously deflected. A stop 36 is secured to base portion 21 to limit the travel of magnet 33. Since the line of force of magnet 33 and the center line of member 23 do not coincide, member 23 is also energized by magnet 33 at the same time it energizes member 27.

In Figure 3 a somewhat different form of the device from that shown in Figures 1 and 2 is illustrated. In this form a base 40 is provided to which is attached an oscillating member 41 in a roughly vertical position. The lower portion of member 41 is machined to form a spring. Near the top of member 41 a horizontal pivot 42 is provided which is mounted with the axis parallel to the plane of the thin portion of member 41. A transparent disc 43 is mounted to rotate freely on pivot 42 about an axis perpendicular to the plane of vibration of member 41. Disc 43 is constrained to vibrate or oscillate about this axis by a hair spring 44. A fine opaque line 45 concentric with disc 43 and a substantial distance in from its outer edge is etched on disc 43. A short section 46 of line 45 is of substantially greater width than the remainder of the line except another short section 47 which is of still greater width. Disc 43 is also provided with a small iron weight 48 and a counter-balancing weight 49 which may be of a non-magnetic material. Mounted in proximity to the weight 48 on a base 50 are a pair of electromagnets 51 and 52 connected in series to a source of power 53 through a switch 54. Electromagnet 52 is arranged to act on weight 48 when energized and magnet 51 is arranged to act on member 41 at the same time. Thus when switch 54 is closed momentarily magnet 52 energizes disc 43 and causes it to oscillate and at the same time magnet 51 energizes member 41 and causes it to vibrate. When the device is arranged in a camera train to make timing lines on a moving strip of sensitive paper the light passing to the paper is focused at point 55 on disc 43.

The application of the device described herein to an oscillograph or recording camera, is diagrammatically illustrated by the arrangement shown in Figure 4. In this figure light from a source 56 is focused through a lens system such as shown at 57 on the strings of an Einthoven or string galvanometer system, the strings of which are shown at 58. The diverging rays of light are re-focused by a second lens system 59 converging again at a point. One of the various timing devices described is erected in the camera in such a manner that the mask (if the types shown in Figures 1 and 2 are used) or the point marked 55 in Figure 3, is at this convergent point. In this figure the device shown in Figure 2 is illustrated. The magnified image of strings 58 is focused by a cylindrical lens 60 on to a moving sheet of photographic paper 61. A roller 62 winds the paper from a supply reel which is situated below reel 62 in such a manner that the paper can be kept in focus while it is being reeled from one to the other.

Referring now more particularly to the form of the device shown in Figure 2 as used in a camera such as that shown diagrammatically in Figure 4, in a preferred method of operation oscillating member 23 has a rate of vibration of 5 cycles per second and member 27 has a rate of vibration of 50 cycles per second. Member 27 is of greater length than the maximum amplitude at which oscillating member 23 is vibrated in the arrangement employed and mask 30 is so located that the distance from the mask to the ends of member 27 is greater than half the amplitude at which member 23 is vibrated. Also mask 30, while of greater width than edge 31, is sufficiently small so that at the minimum amplitudes of vibration to be used with member 23, mask 30 is not in the beam of light except for a small portion of a half cycle of vibration of member 27.

Under these circumstances it becomes apparent that in an arrangement such as that shown in Figure 4, when the two members 23 and 27 are energized and caused to vibrate, the faster member 27 cuts across the beam of light once every 0.01 of a second (twice during each cycle) and thus cuts off the light and produces a line across the sensitive paper. The slower member 23 at the same time moves the whole of member 27 and attached mask 30 so that mask 30 is kept above or below the beam of light except when member 23 passes through its point of rest which occurs once every 0.1 of a second. At these times the light is interrupted longer by reason of the greater width of mask 30 which interrupts the light at these intervals. The longer interruption produces a wider line on the continuously moving strip of paper. Thus the paper will have broad lines 0.1 second apart and narrow lines 0.01 second apart therebetween.

The device has been described above in particular connection with its use as a means of interrupting a beam of light at particular spaced intervals. It will be apparent, however, that it may be used to interrupt the passage of electromagnetic waves generally, masks such as 18 and oscillating members such as 15 being provided with suitable means or made from suitable materials to obstruct the passage of the waves and prevent them from being received upon the recorder such as photographic paper or other means for recording electromagnetic waves.

Furthermore, instead of being arranged to interrupt a beam of light or other waves, the device which forms the object of this invention may be used to reflect the waves. For example, the edge of oscillating member 15 may be silvered to reflect light and mask 18 may be replaced by a mirror. Suitable arrangements in which to employ such a device will be readily apparent to those skilled in the art.

The rates of vibration of the two oscillating members need not be those specified above but may be varied as desired although the two should be different and in the case of the form of the device shown in Figures 1 and 2 the mounted oscillating member (15 or 27) should have the greater frequency. The number of heavy and light lines produced of course vary with the absolute and relative rates of vibration of the oscillating member. As an example, two oscillating members might be used, one of which vibrates twice as fast as the other in which case in the device of Figures 1 and 2 light and heavy lines would alternate.

The placement of the mask also affects the frequency of the heavy lines produced. Thus when the mask is placed as in Figures 1 and 2 it cuts the beam of light twice for every cycle of the slow oscillating member, but if, on the other hand, the mask is placed so that it only cuts the beam of light at one extremity of movement of the slow member then it will only produce a heavy line once a cycle of the slow member. Thus it is contemplated that the mask may be placed at any desired point on the member so long as it is so placed that it cuts the beam of light at least once during every cycle of the slow member. In order to obtain uniformly spaced lines, however, it is obvious that the mask must be so placed that it cuts the beam either at the center of vibration of the slow member (preferable arrangement) or at one of its extremities of vibration.

The form of the device shown in Figure 3 although operating upon the same principle as that shown in Figures 1 and 2 and thus generally subject to the same variations does, nevertheless, differ in some respects. Thus, it involves an oscillating disc as one of the oscillating members. The use of this oscillating disc involves for convenience a different relation of the speeds of the two oscillating members, in that, in the arrangement shown in Figure 3, the mounted member is the slow one and the base member is the fast one. It should be understood, however, that it is within the scope of the invention to have either member the fast one in either form of the invention illustrated.

Other minor differences between the two forms of the device illustrated exist for obvious reasons and do not require comment except in one instance. This instance is the provision of two masks instead of one and the mounting of the masks at the extremities of movement rather than at the center. It has been pointed out above that either of those mountings as well as others may be used with either form of the device but to this Figure 3 adds the variation in which two masks are used which vary in size and thus with the etched line produce three sizes of timing lines on the sensitive paper. Thus if member 41 has a rate of vibration of 50 cycles per second and member 43 has a rate of oscillation of 10 cycles per second there will be very heavy lines every 0.1 of a second and half-way between each of these lines there will be medium heavy lines and in between these very heavy and medium heavy lines there will be light lines every 0.01 of a second so that not only 0.1 second and 0.01 second but also 0.05 second will be marked.

Two different arrangements of electromagnets are shown for energizing the oscillating members. Preferably where two electromagnets are used they will be connected in series or will be controlled by the same switch so that they are deenergized together and start both oscillating members at the same time. Although electromagnets are a particularly convenient means for energizing the oscillating members the invention is not limited to their use and any other desired means for energizing the oscillating members is intended to be included within its scope.

The advantages of the present invention are believed to be apparent from the above description. The device is simple and easy to operate and at the same time is quite accurate. The timing lines which it produces are easily read. It does not depend on the constancy of a source of power but instead is inherently able to time the lines. It does not involve a motor or discs which must be rotated at an exactly fixed speed.

It is apparent that many widely different embodiments of this invention may be made without departing from the spirit and scope thereof and, therefore, it is not intended to be limited except as indicated in the appended claims.

I claim:

1. In an apparatus for recording timing indications on a photosensitive medium, the improvement which comprises means for directing a beam of light toward said photosensitive medium, a first member mounted to oscillate at a constant frequency, an oscillating light mask associated with said first member and arranged to oscillate about an axis substantially parallel to said beam of light at a constant frequency different than the frequency of said first member, the ratio of said frequencies being a small whole number greater than one, said oscillating light mask and said first member being further arranged such that for small motions of the first oscillating member the path of the portion of the light mask interrupting the light beam is perpendicular to the path of motion of the first oscillating member.

2. In apparatus for recording timing indications on a photosensitive medium, the combination which comprises a support, a first member mounted at one end on said support and adapted to oscillate at a constant frequency, a second member mounted on said first member at a point distant from said support and adapted to oscillate at a different constant frequency, the ratio of said frequencies being a small whole number greater than 1, means for directing a beam of light to a point in the path of motion of said second member and thence to said photosensitive medium, said second member being adapted normally to interrupt the light beam for a very short time, and means associated with said second member adapted to interrupt periodically said light for a slightly longer time when the said first member is at a selected point in its oscillating path.

3. Apparatus according to claim 2 wherein the planes of oscillation of said members are perpendicular to the same line.

4. In apparatus for recording timing indications on a moving photosensitive medium, the combination which comprises a support, a first member mounted at one end on said support and adapted to oscillate at a constant frequency, a second member adapted to oscillate at a different constant frequency mounted on said first member at a point distant from said support with its longitudinal axis substantially perpendicular to the longitudinal axis of and lying substantially in the plane of oscillation of said first member when at rest, the ratio of the frequency of said second member to that of said first member being a small whole number greater than 1, means for directing a beam of light to a point in the path of motion of said second member substantially perpendicular to the plane of said motion and thence to said photosentitive medium, whereby said beam of light is interrupted for a very short time at definite intervals related to the frequency of oscillation of said second member, and means mounted on said second member for slightly increasing the time of interruption of said beam of light at definite intervals related to the frequency of oscillation of said first member.

5. Apparatus according to claim 4 wherein the frequency of oscillation of said first member is 5 cycles per second and that of said second member is 50 cycles per second.

6. Apparatus according to claim 4 wherein both of said members are arranged to oscillate in planes perpendicular to the direction of said beam of light and said last-mentioned means is a mask presenting to said beam a width greater than that presented by said second member.

7. In apparatus for recording timing indications on a moving photosensitive medium, the combination which comprises a support, a first member mounted at one end on said support and adapted to oscillate at a constant frequency, a second member composed at least in part of transparent material adapted to oscillate at a different constant frequency rotatably mounted on said first member at a point distant from said support, the planes of oscillation of said members being perpendicular to the same line and the ratio of said frequencies being a small whole number greater than 1, means for directing a beam of light through a transparent portion of said second member and thence to said photosensitive medium, an opaque line on said transparent portion adapted to interrupt said light beam at least once during each oscillation of one of said members and at least one relatively wide opaque area on said line adapted to cause said interruption to be of greater duration at least once during each oscillation of the other of said members.

8. Apparatus according to claim 7 wherein said first member has a frequency greater than that of said second member.

JOSEPH D. EISLER.